Nov. 26, 1935.  H. B. WHITMORE  2,022,069

FILTER

Filed Nov. 1, 1932  3 Sheets-Sheet 1

INVENTOR
Horace B. Whitmore
BY
ATTORNEYS

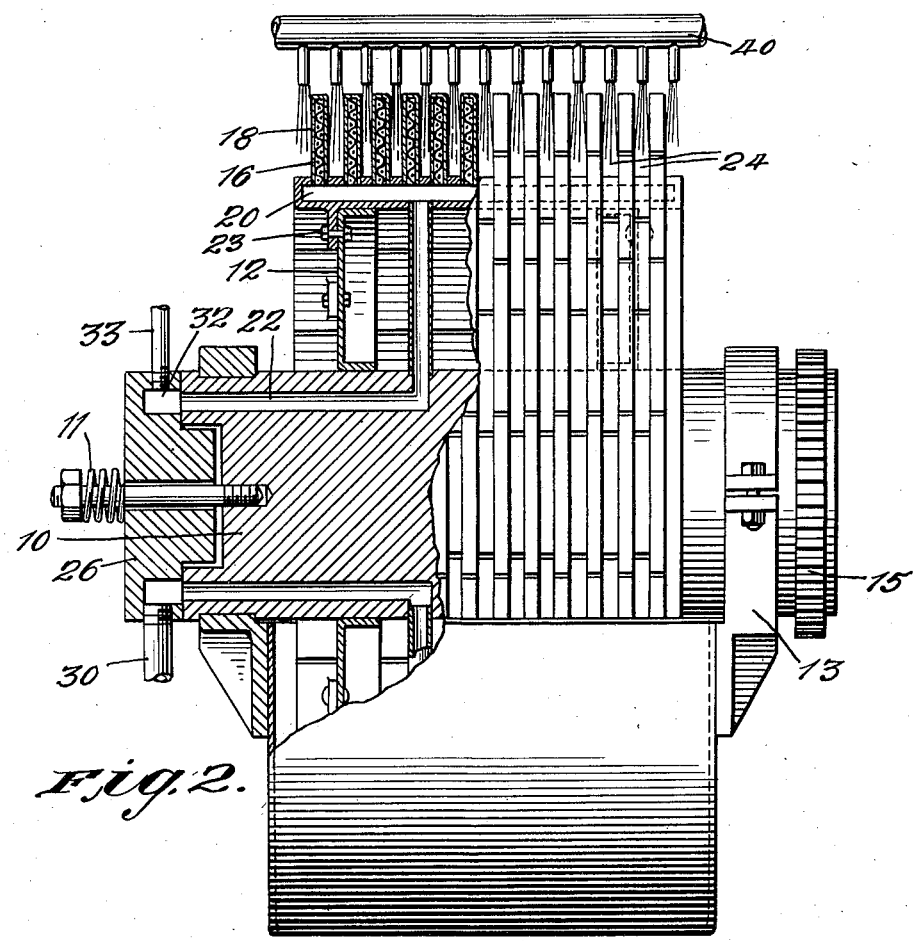
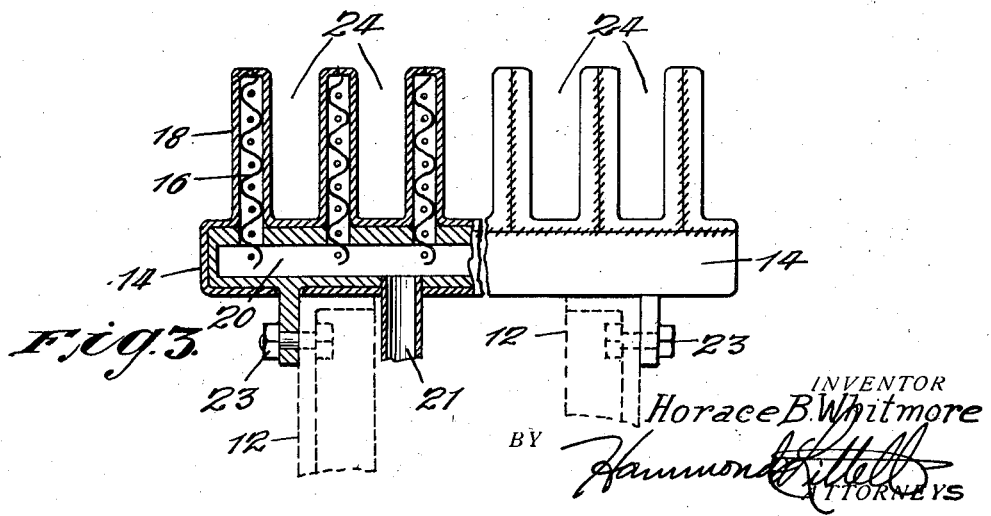

Nov. 26, 1935.    H. B. WHITMORE    2,022,069
FILTER
Filed Nov. 1, 1932    3 Sheets-Sheet 3
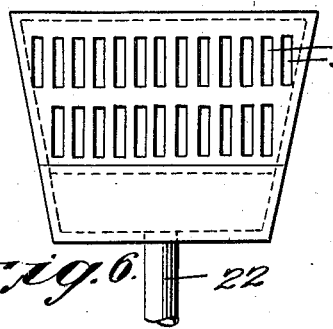
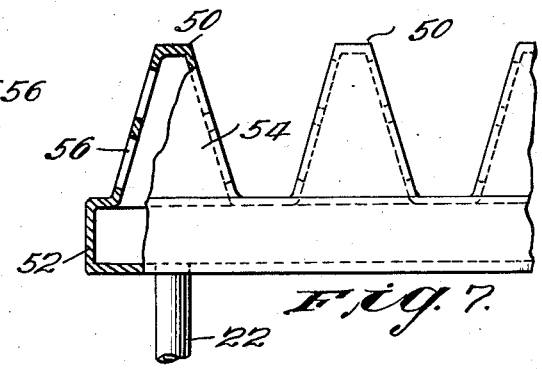
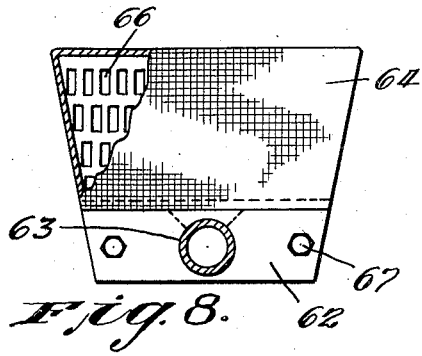
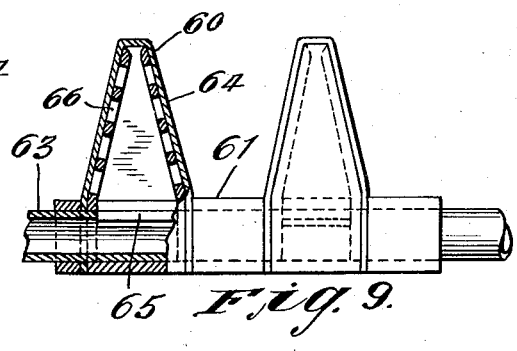
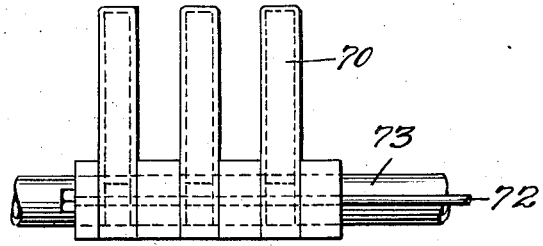
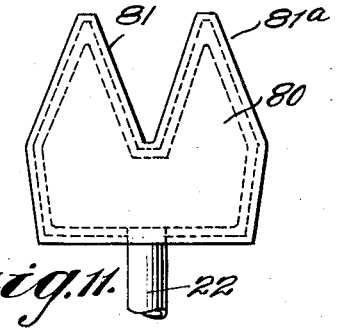
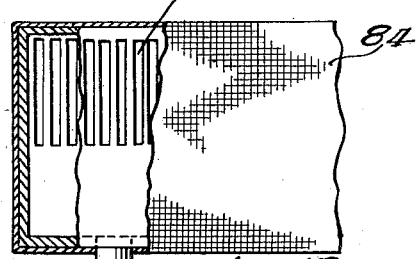
INVENTOR
Horace B. Whitmore
BY
ATTORNEYS Patented Nov. 26, 1935

2,022,069

UNITED STATES PATENT OFFICE 2,022,069

FILTER

Horace Bryan Whitmore, San Francisco, Calif.

Application November 1, 1932, Serial No. 640,574.
In Germany November 17, 1931

7 Claims. (Cl. 210—200)

This invention relates to improvements in filters and more particularly to the method of operation and apparatus for continuous filtration.

It is one of the features of my invention to provide a filter which may preferably be of the continuous type in which the filter surface is carried on a rotatable member and which surface is irregular in shape forming transverse or longitudinal or diagonal channels or grooves in order to increase the area of filtration.

Another object of my invention is, to provide a continuous suction filter with a plurality of separate filter units integrally mounted together to form a filter group which may be carried on a suitable spider or skeleton drum spaced from the filter shaft, each of the filter groups being of irregular shape having depressed channels or grooves between the elements, the projecting units being separately covered whereby the filter surface and filter efficiency is greatly increased without material increase of the overall size of the filter.

Another object of my invention is to provide a countercurrent washing and discharge apparatus particularly for discharging or washing the solids in a direction countercurrent to the direction of rotation and prior to complete drying of the cake on the filter element to remove further cake values or to secondarily filter the washed cake depending on the effect desired and the arrangement of the filter valve ports.

Another object of my invention is to provide a countercurrent washing apparatus in connection with a suction filter having an irregular filter surface in which a substantial amount of the cleaning of the filter surface can be carried out prior to the final discharge and so that the countercurrent washing will substantially fill the channels between the filter units and will be discharged over a flexible deflector on the opposite side of the drum into a suitable discharge conduit.

A further object of the invention is to provide a circuit of flow for repulping the discharged filter cake and resluicing the repulped filter cake for further countercurrent or concurrent cleaning, to increase the thickness and impermeability of the filter cake.

Another feature of the invention is that the filter units are integrally formed into longitudinal filter groups, each unit being of segmental shape in end elevation and forming a complete cylinder with the remaining units, whereby more rapid replacement and repair can be had and so that but one drainage conduit is required for the entire group, the separate filter units being relatively close together and, in a complete row, forming a crenelated effect.

Further objects and advantages of my invention will appear from the following disclosure thereof taken in connection with the attached drawings which illustrate preferred forms of embodiment of my invention and in which;

Figure 2 is a side elevation also partially in section of the filter shown in Figure 1;

Figure 3 is an enlarged elevational view partially in section of a filter group;

Figures 6 and 7 are end views and side elevational views respectively of a modified form of filter group;

Figures 8 and 9 are end views and side elevational views respectively of a still further modified form of filter group;

Figure 10 is a partial side elevation of a still further modified form of filter group;

Figures 11 and 12 are end views and side elevational views respectively of still further modified forms of filter groups.

Figure 1:
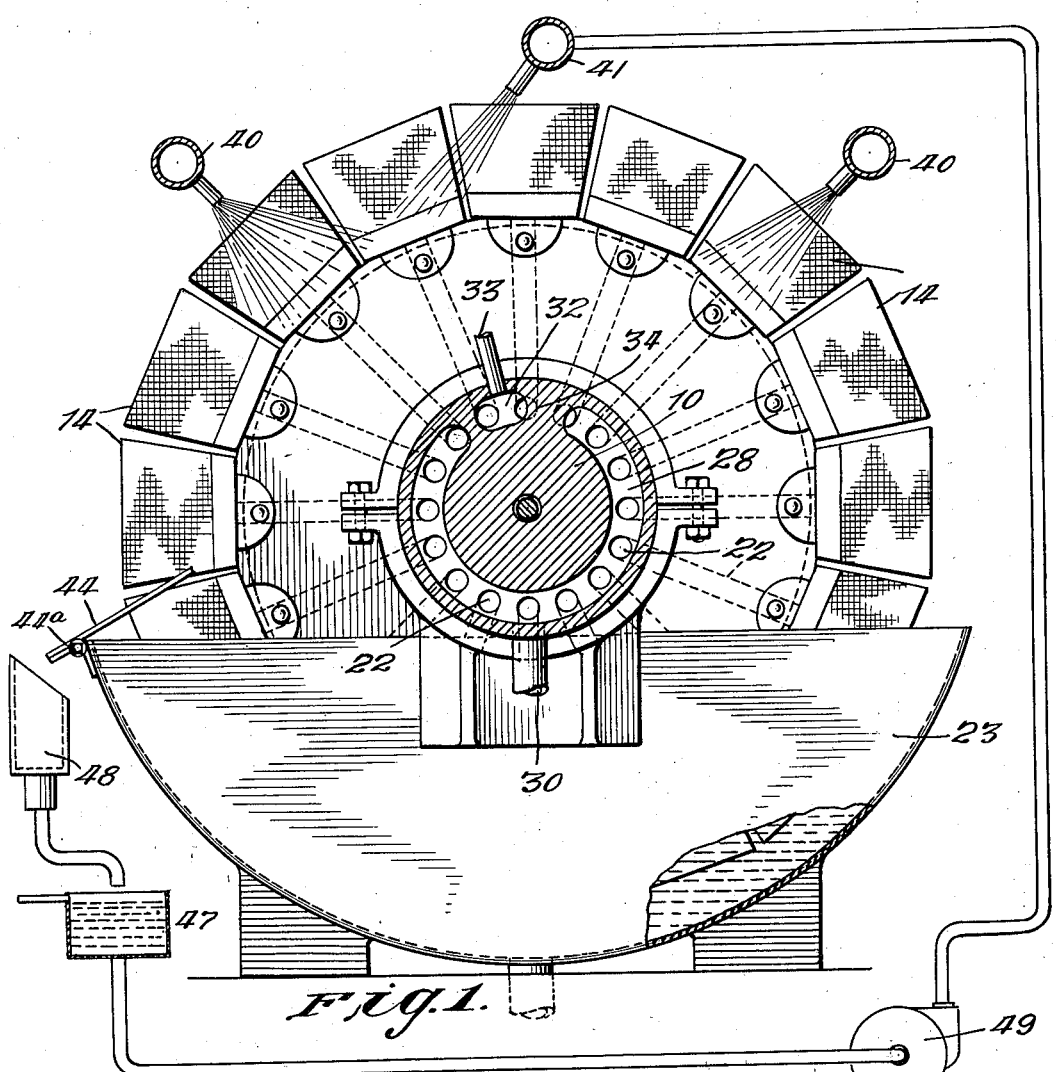
Figure 1 is an end elevation, partially in section of a continuous filter.

The continuous filter shown as one embodiment of my invention is built around a central filter shaft 10 preferably having a drum shape framework 12 which supports the filter groups 14. There are a plurality of groups for sectional filtration. The shaft may be supported in any desired form of bearings 13 and be driven by the gear 15 from any desired source of power and at any desired speed or in any direction.

The filter groups 14 include a plurality of filter units 16 which are segmental in end view and a plurality of groups 14 are mounted thus forming the total filter area. The frame 12 increases the effective diameter of the filter and permits the use of a greater number of filter groups and therefore not only increases the area of filtration but also the path of travel for efficient filtration.

Figures 4, 5:
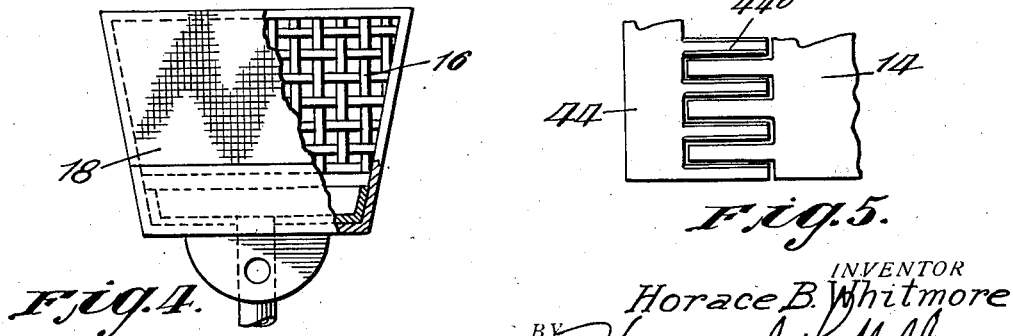
Figure 4 is an end view of the filter group shown in Figure 3.
Figure 5 is a partial plan view of the flexible scraper or deflector shown in Figure 1.

The filter group 14 as more clearly disclosed in Figures 3 and 4, is provided with a suitable mesh screen which may be an applied wire backing or an integral casting of web shape which in turn supports the filter fabric 18. This fabric 18 which may be of woven cloth or wire acts as the filter for the solids and permits the filtrate to travel into the interior drainage area 20 and thence through the radial conduit 21 to the appropriate conduit 22 in the filter shaft 12.

Each filter group preferably has a plurality of integral upstanding filter units formed by the separate covered segments 18 and extends entirely across the filter. As each unit is adapted to withdraw filtrate into the common drainage area 20 which also extends transverse to the filter it is only necessary to use one drainage conduit 21 and all of the units of a group will simultaneously filter. Suitable bolts 23, secure the filter group to the drum frame 12 so that the entire group may be removed if desired.

The filter units 18 form channels 24 for contact with the filter pulp and they will also act as drainage channels as the wash water or discharging fluids will tend to fill the space between the units. Complete drainage can therefore be had and a much greater area is thus exposed to the filter pulp or wash water than is possible with the commonly known drum filters.

The drainage areas 20 of filter groups 14 are each connected through a suitable valve 26, and cooperating common port 28 into which the filter shaft conduits 22 open with a suitable suction conduit 30. The valve simultaneously communicates with a number of filter groups so that substantially all of the filter groups are under filtering suction through a substantial period of movement. The blowback port 32 may be connected through the pressure pipe 33 to a suitable source of pressure for additionally assisting in the discharge of the filter cake. The valve 26 is also provided with two blank spots 34 at which time no pressure differential operates on the filter units.

If desired, the valve 26 may be held to the shaft 10 by a suitable spring 11 which will permit sufficient fluctuation to prevent damage by pressure extremes as well as to permit free rotation of the shaft 10 with respect to the fixed valve.

If the filter cake is desirably washed, suitable sprays 40 can be used which may be directed radially toward the center of the filter shaft and as shown in Figure 1, pass into each channel 24 between the units 16. These sprays may introduce water or other solvents or if desired may introduce additional filter feeds to improve the texture of the filter cake and to assist in drying them. This may be particularly desired in thickeners for example.

In a particular form, however, I arrange a spray 41 in a direction to traverse the filter units before they pass beneath the spray so that the spray of material will normally pass opposite the direction of movement of the filter units. This countercurrent washing of the filter units has an important advantage in that the liquid will wash the collected solids free of the original solution entrained during the filtration period. Furthermore, a certain percentage of the discharged solids will be redeposited on the filter surfaces before they can be discharged over the deflector 44 which is serrated or crenelated in shape to follow the crenelation of the filter elements 14. Therefore, the solids are rewashed and if a further liquid is necessary it may be added through the ports 40.

The two principal deficiencies which exist in present types of vacuum filters where applied to the clarification field are the difficulties in effecting satisfactory discharge of the solids and cleaning of the cloth and too limited filtering surface and therefore too limited capacity for units of given dimensions. The former of these objections is overcome by the countercurrent washing and the latter by the means of the filter group 14 as described.

The deflector 44 is preferably pivoted at 44a adjacent the point of emergence of the filter elements from the tank 23. The projections 44b of the deflector 44 are preferably of rubber or otherwise flexible especially on the edges so that the filter cake may pass upwardly past the deflector, but on contact of the wash water from port 41, the cake will be deflected away from the filters and into the discharge channel 48. It is also possible to increase the clearance between the projections 44b on the deflector 44 but this is unsatisfactory because it will permit the thin cake to return into the filter pulp tank 23 and will still interfere with the passage of the thicker cake. With the flexible element the wash water and even the thin cake is deflected and there is no interference with the thicker cake.

It is obvious that in this filter element that there is no limit to the closeness of the filter surfaces other than the thickness of the layer of the deposited solids. This close spacing of the filter surfaces also assists materially where it is desired to wash the cake since a limited amount of liquid is required in counter-flow to completely fill the spaces between the surfaces, thereby submerging these surfaces and insuring better washing.

It is possible to move the countercurrent wash jet 41 to a position substantially directly over the deflector 44 and the suction port 28 and back pressure port 32 in the valve may be varied accordingly. It is also possible to increase the depth of the filter pulp pan 23 carrying such pan above the center of rotation and it is also of course possible to change the direction of rotation if desired. Such constructions will depend on actual working conditions and if washing of the cake is unnecessary and counterflow inadvisable but longer filtration of paramount importance, this may readily be accomplished.

The spray 40 may be used to pre-coat the filter surface with diatomaceous earths or similar materials. With the present construction of irregular filter surfaces the spray coating is particularly satisfactory.

It is also to be understood that while the countercurrent washing through the spray 41 is particularly satisfactory where irregular surface filters are used, it is also operable with plane surface conventional drum rotary filters.

The countercurrent spray 41 may be of a liquid previously used for sluicing and repulped in the tank 47 from which it is drawn by the pump 49 and returned to the spray pipe 41. In this manner, filter cake is discharged as an overflow product and the repulped liquid will not dilute the cake to the extent that fresh water might. This also is a matter of operating advantage and may be readily carried out on my filter.

As shown in Figure 3, the filter fabric 18 is cut in such a pattern that it will separately cover each of the projecting filter units 16 in the filter group 14. This is probably a preferred construction in that the exposed surface is irregular and yet held in a fixed position by the integral relation to the group to form transverse channels 24. In Figures 6 to 9 inclusive, I have shown, slight modifications of this construction in which the filter segment 50 of the group 52 may be of solid metal, wood, or other material and will have a sawtooth profile in front elevation and segmental in shape in end view. This profile is covered with a suitable filter material 54 which may be stitched or otherwise secured along the sides as desired. Suitable holes in the sides of the filter segment 50 may be of long slot shape as shown at 56 in Figure 6, or of short slot shape such as shown at 66 in Figure 8. In Figure 7, the construction is preferably a single casting or a single unit wood frame whereas in Figure 9 separate segments 60 are built up and spacers 61 placed between the different segments as desired, the entire assembly being held by bolts 67.

The drainage of the group 62 shown in Figure 9, is into a separate transverse conduit 63 which is provided with suitable apertures 65 for drainage purposes. A suitable fabric 64 is used to cover each of the filter segments.

In Figure 10 the filter units 70 are preferably held together by suitable rods 72 on the through conduit 73 which drains the separate units. These units have parallel sides, and are preferably segmental in shape in end view as shown in Figure 8 or Figure 11.

A further construction is shown in Figures 11 and 12 in which the flutes or channels run longitudinally of the drum. The segments 80 may thus be of sawtooth shape at right angles however to the construction shown in Figures 6 to 9 inclusive. The V slot 81 will be formed between the sides of the segment and each adjacent pair of segments 80 will form a second V shaped slot 81a. The slanting sides of the segment have drainage slots 82 which are covered with filter fabric 84 and will drain the fabric and permit the filtrate to pass out through the radial conduit 22.

The surface of the filter therefore may be corrugated, fluted, ribbed, crenellated, or otherwise formed so that the effective filter area is substantially greater than it would be if the filtering surface occurred only on the peripheral surface of a cylinder of the same outer diameter and length. These channels may thus run in all directions across the drum as desired.

The filter is easily made, and assembled and has many economical operating advantages. The filter groups may be readily removed and replaced as desired and the surface is substantially larger than the usual drum filter.

While I have shown preferred forms of embodiment of my invention, I am aware that other changes may be made thereto and I therefore desire a broad interpretation of my invention within the scope and spirit of the disclosure herein of the claims appended hereinafter.

I claim:

1. The method of discharging filter cake from the filter elements of a continuous rotary suction filter which includes the step of washing the filter cake from the filter element by a projected stream opposite in direction to the direction of rotation of said filter elements whereby the discharged cake will pass over filter areas still under suction.

2. A continuous rotary filter of the class described comprising a filter shaft, a plurality of separate filter units mounted on said shaft, each of said filter units having a plurality of irregular shaped filter segments, said filter segments having a plurality of filter surfaces, said filter surfaces having sloping sides forming a sawtooth profile and V-shaped channels transverse to the filter surface.

3. A rotary filter of the class described comprising a crenellated filter surface, a sluicing mechanism and deflector means cooperating with said surface to deflect sluiced cake and wash water from said filter, means to collect said sluiced water and discharged cake, means to repulp said discharged cake and wash water, and means to introduce said repulped mixture into the sluicing mechanism.

4. The method of filtering solids from liquids which comprises forming a filter cake on the filter elements while drawing the liquid through said filter elements, directing a discharge stream of filtered liquid against the filter cake in a direction opposite to the movement of said filter cake and in a manner to disintegrate said filter cake and wash it over the previously formed filter cake to increase the thickness of said filter cake.

5. A filter of the class described comprising a filter shaft, a plurality of filter units spaced from each other in parallel relation and secured to said shaft, a unitary covering of filter material extending over said filter units and forming channels therebetween to provide an extensive unitary filtering area over and between said filter units.

6. A rotary filter of the class described comprising a filter surface, deflector means cooperating with said surface to deflect sluiced cake and wash water from said filter, means to collect said sluiced water and discharged cake, means to repulp said discharged cake in wash water, means to introduce said repulped mixture into a sluicing mechanism, and means to discharge said repulped mixture over said cake for sluicing purposes.

7. The method of filtering solids from liquids to form a thickened filter cake which comprises forming a filter cake on a filter surface, sluicing said cake off said filter medium with a previously sluiced and repulped filter cake, repulping the sluiced filter cake and subsequently separating the sluiced filter cake into a further sluicing product and a thickened end product.

HORACE BRYAN WHITMORE.